United States Patent
Hsu

(10) Patent No.: US 6,746,141 B2
(45) Date of Patent: Jun. 8, 2004

(54) AUXILIARY REARVIEW MIRROR AND LIGHT ASSEMBLY

(75) Inventor: Henry T. H. Hsu, Old Westbury, NY (US)

(73) Assignee: American Auto Accessories, Inc., Corona, NY (US)

( * ) Notice: Subject to any disclaimer, the term of this patent is extended or adjusted under 35 U.S.C. 154(b) by 27 days.

(21) Appl. No.: 10/213,706

(22) Filed: Sep. 26, 2002

(65) Prior Publication Data

US 2004/0062051 A1 Apr. 1, 2004

(51) Int. Cl.7 .................................................. B60Q 1/04
(52) U.S. Cl. ........................ 362/494; 362/492; 362/396; 359/844
(58) Field of Search ................................. 362/140, 141, 362/142, 144, 492, 494, 396; 359/844, 871

(56) References Cited

U.S. PATENT DOCUMENTS

| | | | |
|---|---|---|---|
| D289,989 S | 5/1987 | Skogler et al. ............. | D12/188 |
| D300,312 S | 3/1989 | Skogler et al. ............. | D12/188 |
| 5,253,115 A | * 10/1993 | Ueno ........................... | 362/494 |
| D390,524 S | 2/1998 | Deline et al. ............... | D12/187 |
| 5,724,199 A | * 3/1998 | Hu ............................... | 359/871 |
| 5,923,457 A | 7/1999 | Byker et al. ................. | 359/271 |
| 5,970,619 A | 10/1999 | Wells ............................ | 33/264 |
| 6,412,973 B1 | * 7/2002 | Bos et al. .................... | 362/494 |

\* cited by examiner

Primary Examiner—Stephen F. Husar
(74) Attorney, Agent, or Firm—Robert C. Kain, Jr.; Fleit Kain

(57) ABSTRACT

An auxiliary rearview mirror and light assembly includes a non-incandescent light source, an auxiliary rearview mirror, a power source adapter, and a primary rearview mirror mounting assembly. The primary rearview mirror mounting assembly includes at least one fixed appendage and at least one adjustable appendage. The fixed appendage and the adjustable appendage are positioned in an opposing direction. The adjustable appendage has a bias element that exerts a force on the adjustable appendage in a direction towards the fixed appendage. The adjustable appendage is extensible to fit the primary rearview mirror.

21 Claims, 4 Drawing Sheets

AUXILIARY REARVIEW MIRROR AND LIGHT ASSEMBLY

BACKGROUND OF THE INVENTION

1. Field of the Invention

The invention generally relates to auxiliary rearview mirrors and more specifically to auxiliary rearview mirrors with lights.

2. Description of the Related Art

It is known in the art that rearview mirrors have been associated with motor vehicles for a long time. Prior art rearview mirrors are typically found mounted to one of three surface areas in the motor vehicle. These three surface areas are the dashboard, the upper interior surface of the front windshield, and the interior of the roof adjacent to the front windshield. Rearview mirrors are commonly mounted to these surfaces using screws, bolts, and/or adhesive. To enhance the utility of vehicle rearview mirrors several design alternatives have been employed. One alternative is to affix an auxiliary rearview mirror to a primary rearview mirror. The primary rearview mirror is the rearview mirror that is typically mounted to the motor vehicle during initial manufacture. Many times the auxiliary rearview mirror is an after market product purchased and installed by the consumer. The auxiliary rearview mirror is affixed by either adhesion to the face of the primary rearview mirror or mounted to the housing of the primary rearview mirror. Auxiliary rearview mirrors are useful to enhance rear visibility when performing vehicular functions such as towing and/or hauling. Designs consistent with this idea have also been used to reduce and/or eliminate primary rearview mirror blind areas.

Although the use of auxiliary rearview mirrors is beneficial it is not without its shortcomings and problems. One problem is the mounting of the auxiliary rearview mirror. If the auxiliary rearview mirror is affixed with adhesives the resulting effect is to have a permanently installed auxiliary rearview mirror. Additionally, adhering the auxiliary rearview mirror requires careful placement and adhesion of the mounting surface to the face of the primary rearview mirror. If the auxiliary rearview mirror is mounted to the primary rearview mirror the existing mounting assemblies result in a semi-permanent installation. Mounting assemblies typically consist of bolt down mechanism that require time and care in placement. Mounting assemblies can also result in marring of the mounting surface of the primary rearview mirror. Many consumers do not want permanent additions to their vehicle since many times a given vehicle is used by more than one individual within a family with different needs. The permanence of prior art mounts results in consumer reluctance to install and/or remove the auxiliary rearview mirror. Accordingly, a need exists to provide an auxiliary rearview mirror that integrates a mounting assembly that provides for simple installation and removal from a primary rearview mirror.

Auxiliary rearview mirrors have also integrated functional elements with the designs. Typically this will be elements such as map lights, and/or signal lights. Designs integrating functional elements to the design generally provide additional utility to the consumer. Presently there exists a consumer base that is interested in a purely aesthetic light without the demand for functionality. This is apparent in the increased consumer demand for vehicular effects lighting. Vehicle effects lighting is generally limited to non-incandescent lights mounted under the vehicle carriage and around the license plate frame. The non-incandescent lights include lights such as neon and/or black lights. Effects lighting permits consumers to personalize vehicle aesthetics. To fulfill the consumer desire to personalize vehicle aesthetics additional designs integrating effects lighting to vehicle interiors is needed. Problems exist with the availability of effects lighting in the interior of vehicles. Moreover, as stated above, if a given vehicle is used by different drivers within a family, the younger drivers may have different aesthetic desires than the older drivers. Accordingly, a need exists to over come these problems and to provide an auxiliary rearview mirror and light assembly that integrates a non-incandescent light source which is easy to install and/or remove from the primary rearview mirror.

Another alternative design is a replacement rearview mirror. The replacement rearview mirror typically integrates functional elements not found in the original rearview mirror. As with the auxiliary rearview mirror discussed above, lights associated with this type of design generally provide additional utility to the consumer. This results in a problem for the consumer who desires aesthetic vehicle lighting but wishes to avoid the expense of special electrical wiring for the light Additionally, often the removal of the original rearview mirror is required. This will add to the overall cost and time it takes to install the replacement rearview mirror. Accordingly, a need exists to provide an auxiliary rearview mirror and light assembly that permits easy wiring for the consumer.

SUMMARY OF THE INVENTION

Briefly, in accordance with the present invention, disclosed is an auxiliary rearview mirror and non-incandescent light assembly mountable on a primary rearview mirror. A casing houses the non-incandescent light source, a rearview mirror, and a power source interface. The casing has openings formed on one or more sides permitting outward illumination of the non-incandescent light source from the casing. A mounting assembly is integrated into the housing. The mounting assembly comprises at least one fixed appendage and at least one adjustable appendage. The fixed and adjustable appendage are opposed permitting placement of a primary rearview mirror between the fixed and adjustable appendage. The adjustable appendage is extensible permitting adjustment to fit varying sizes of primary rearview mirrors. A bias force is maintained on the adjustable appendage such that a resultant force acts towards the fixed appendage effectively clamping the auxiliary rearview mirror in place. The mounting assembly permits easy installation and removal of the auxiliary rearview mirror and light assembly. A plug adapted to receive power from the vehicle auxiliary power receptacle and/or cigarette lighter receptacle provides power to the incandescent light source.

BRIEF DESCRIPTION OF THE DRAWINGS

The subject matter that is regarded as the invention is particularly pointed out and distinctly claimed in the claims at the conclusion of the specification. The foregoing and other features, and advantages of the invention will be apparent from the following detailed description taken in conjunction with the accompanying drawings. Additionally, the left-most digit of a reference number identifies the drawing in which the reference number first appears.

DETAILED DESCRIPTION OF THE PREFERRED EMBODIMENTS

It is important to note, that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and visa versa with no loss of generality.

The present invention, according to a preferred embodiment, overcomes drawbacks and problems with the prior art by integrating a non-incandescent light source with an auxiliary rearview mirror mountable to a primary rearview mirror. A preferred embodiment of the present invention is now described.

Figure 1:
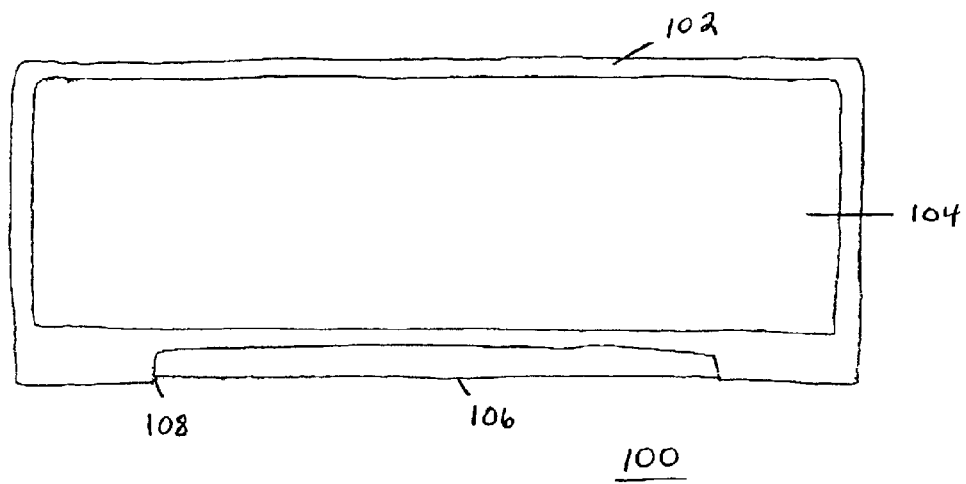
FIG. 1 is an elevated front view of an auxiliary rearview mirror and light assembly, according to the present invention.

FIG. 1 is an elevated front view 100 of an auxiliary rearview mirror and light assembly. A front casing 102 comprises a front to a housing that houses an auxiliary rearview mirror 104, a light source 106, and a power source interface 402, illustrated in FIG. 4. The front casing 102 is manufactured from metal and/or plastic. The front casing 102 is formed to be translucent and/or is formed colored. The light source 106 is at least one non-incandescent light including flourescent, neon, and black light. The auxiliary rearview mirror 104 is flat, concave, and/or convex. There is at least one opening 108 formed between the front casing 102 and rear casing 202, illustrated in FIG. 2, providing a path of illumination from the light source 106 outward from the front casing 102 and the rear casing 202.

Figure 2:
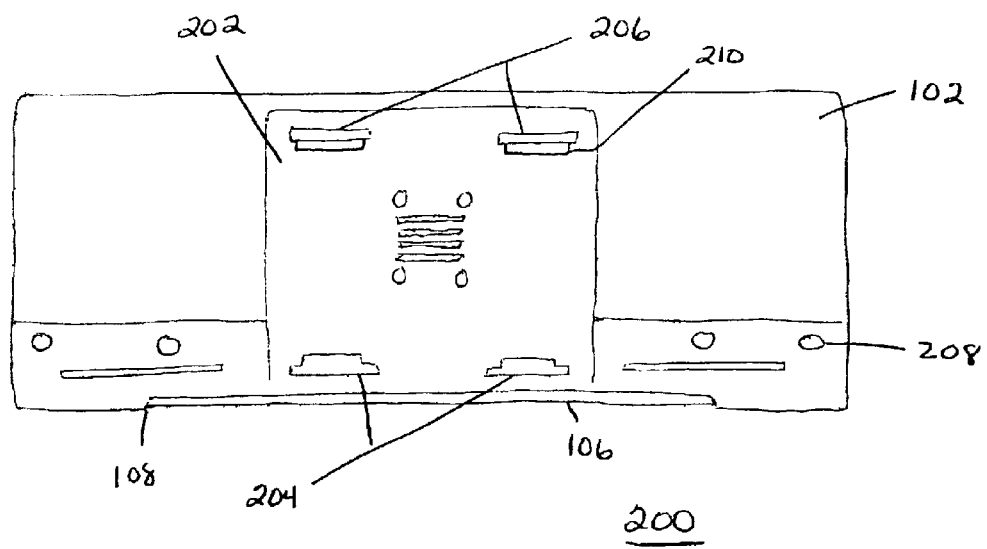
FIG. 2 is an elevated rear view of FIG. 1, according to the present invention.

FIG. 2 is an elevated rear view 200 of FIG. 1. The rear casing 202 comprises a back to a housing that houses the auxiliary rearview mirror 104, the light source 102, and the power source interface. The rear casing 202 is manufactured from metal and/or plastic. The rear casing 202 is formed to be translucent and/or is formed colored. At least one fixed appendage 204 and at least one adjustable appendage 206 is integrated into the rear casing 202. The fixed appendage 204 is comprised of a metal and/or plastic. A rubber extension 210 is coupled to the fixed appendage 204. In another embodiment the extension is manufactured from metal and/or plastic (not shown). The adjustable appendage 206 is extensible. The adjustable appendage 206 is manufactured from rubber. In another embodiment the adjustable appendage 206 is manufactured from metal and/or plastic (not shown). The rear casing 202 has one or more openings or holes 208 formed therein suitable for inserting screws. The rear casing 202 is coupled to the front casing 102 by screws which are inserted into the holes 208 in the rear casing 202. In another embodiment the rear casing 202 is coupled to the front casing 102 by one or more threaded bolts, or one or more screw-less fasteners, such as glue, adhesives, press fit, snap fit or rivets or any equivalent combination thereof (not shown).

Figure 3:
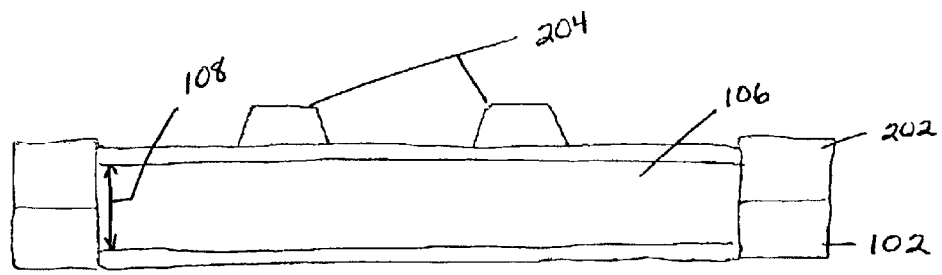
FIG. 3 is an elevated bottom view of the auxiliary rearview mirror and light assembly illustrated in FIG. 1, according to the present invention.

FIG. 3 is an elevated bottom view 300 of the auxiliary rearview mirror and light assembly illustrated in FIG. 1. The front and the rear casing 102 and 202 house the light source 106 and the power source interface 402, illustrated in FIG. 4. The opening 108 formed between the front and rear casing 102 and 202 provides a path of illumination from the light source 106 outward from the front casing 102 and the rear casing 202. At least one fixed appendage 204 is integrated to the rear casing 202.

Figure 4:
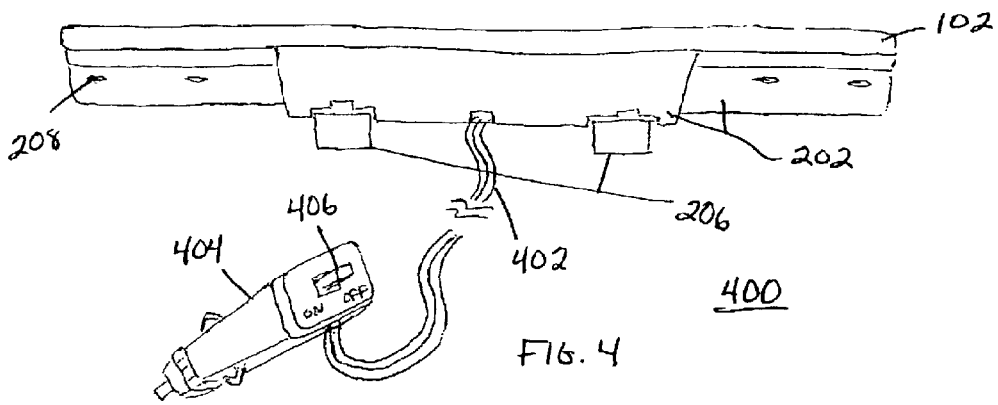
FIG. 4 is an elevated top view of the auxiliary rearview mirror and light assembly illustrated in FIG. 1, according to the present invention.

FIG. 4 is an elevated top view 400 of the auxiliary rearview mirror and light assembly illustrated in FIG. 1. The front casing 102 is coupled to the rear casing 202 with screws inserted into the openings or holes 208 in the rear casing 202. At least one adjustable appendage 206 is integrated to the rear casing 202. The power source interface 402 is electrically coupled to a power source adapter 404. The power source adapter 404 comprises a plug adapted to receive power from a vehicle auxiliary power receptacle and/or a vehicle cigarette lighter receptacle (not shown). In another embodiment the power source interface 402 is electrically coupled to a power source such as a battery, a generator, and equivalent. The power source adapter 404 has a switch 406. The switch 406 is electrically coupled to the light source 106 and the power source adapter 404. The switch 406 is operable to turn the light source 106 on and off.

Figure 5:
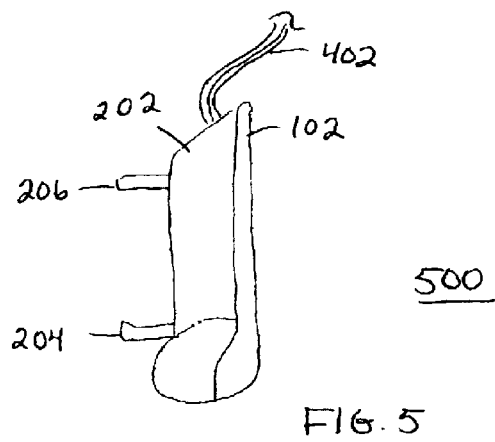
FIG. 5 is a side view, of the auxiliary rearview mirror and light assembly illustrated in FIG. 1, according to the present invention.

FIG. 5 is a side view 500 of the auxiliary rearview mirror and light assembly illustrated in FIG. 1. Note the fixed appendage 204 and the adjustable appendage 206 act as opposing sets of "fingers" to securely grip a primary rearview mirror 802, illustrated in FIG. 9.

Figure 6:
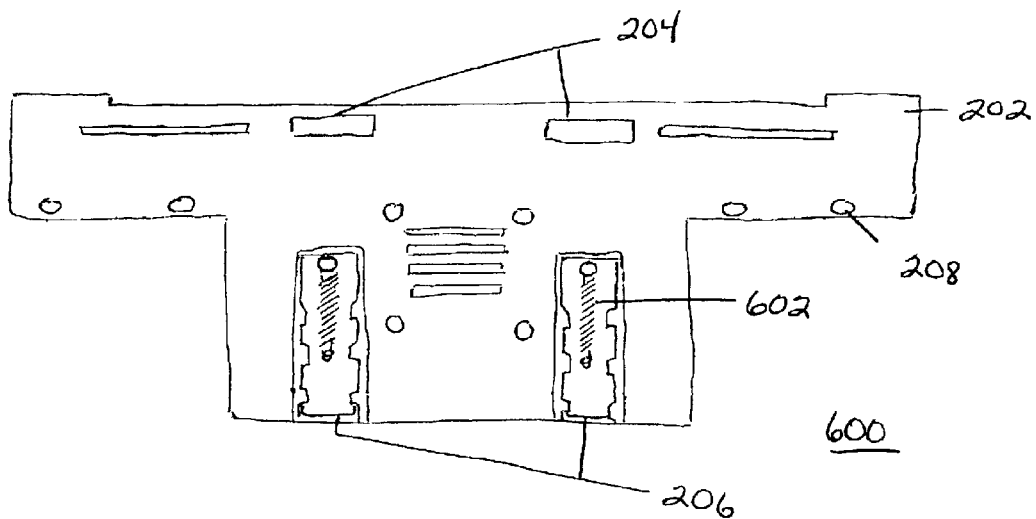
FIG. 6 is an internal view of the rear casing of the auxiliary rearview mirror and light assembly of FIG. 2, according to the present invention.
Figure 7:
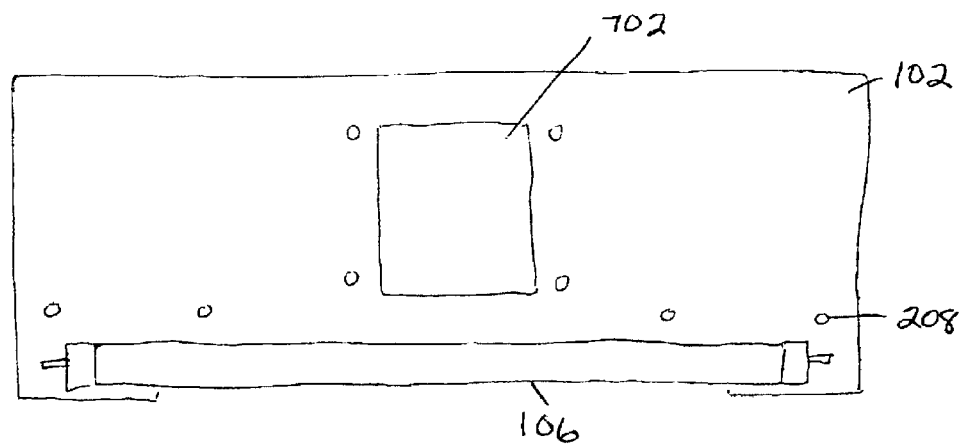
FIG. 7 is an internal view of the front casing of FIG. 1, according to the present invention.

FIG. 6 is an internal view 600 of the rear casing of the auxiliary rearview mirror and light assembly of FIG. 2. At least one fixed appendage 204 and at least one adjustable appendage 206 is integrated into the rear casing 202. The adjustable appendage 206 is opposed the fixed appendage 204. At least one bias element 602 acts on the adjustable appendage 206 so that a resultant force acts in a direction towards the fixed appendage 204. The bias element 602 permits adaptation of the adjustable appendage 206 to varying sizes of primary rearview mirrors 802 (not shown). The bias element 602 includes a spring, coil, elastic, and equivalent. FIG. 7 is an internal view 700 of the front casing of FIG. 1. The front casing 102 has a surface area 702 suitable for placement of a power source interface 402. The power source interface 402 is electrically coupled to the light source 106.

Figure 8:
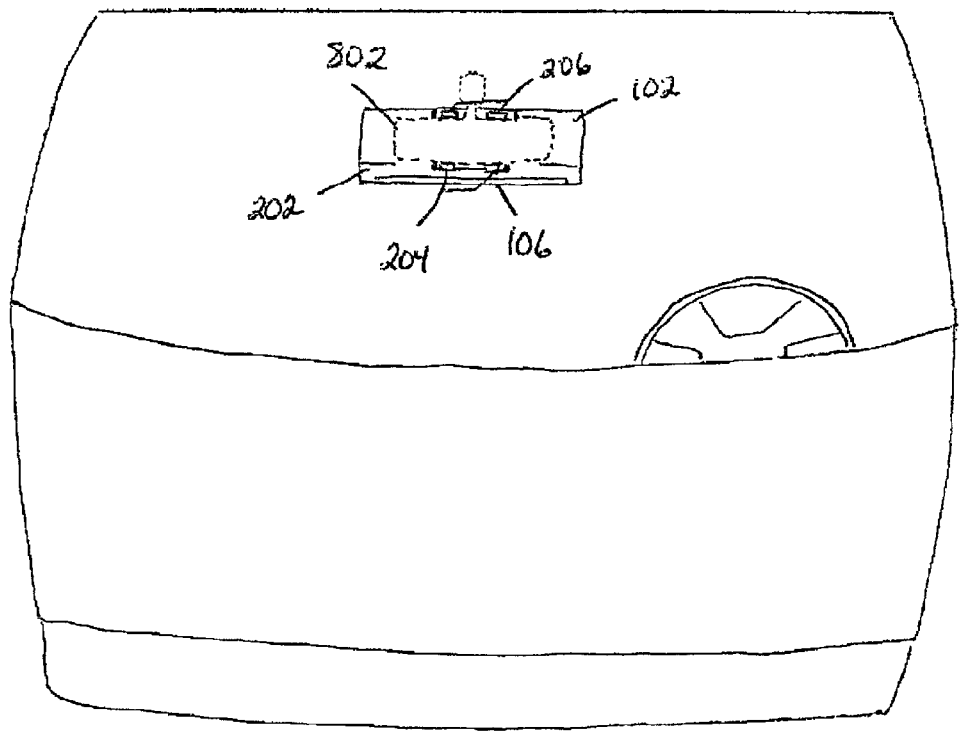
FIG. 8 is an environmental view of the auxiliary rearview mirror and light assembly of FIG. 2 mounted to a vehicle primary rearview mirror, according to the present invention.

FIG. 8 is an environmental view of the auxiliary rearview mirror and light assembly of FIG. 2 mounted to a vehicle primary rearview mirror. The fixed appendage 204 and adjustable appendage 206 are opposed to grip the vehicle primary rearview mirror 802. The auxiliary rearview mirror and light assembly 200 mounts to the front of the primary rearview mirror 802.

Figure 9:
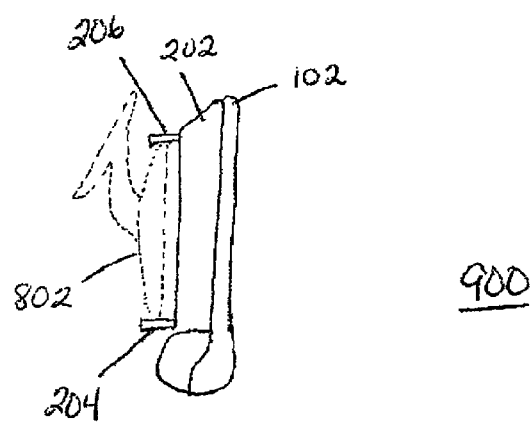
FIG. 9 is an environmental view of the auxiliary rearview mirror and light assembly of FIG. 5 mounted to a primary rearview mirror, according to the present invention.

FIG. 9 is an environmental view of the auxiliary rearview mirror and light assembly of FIG. 5 mounted to a primary rearview mirror. The fixed appendage 204 and adjustable appendage 206 act as opposing sets of "fingers" to grip the primary rearview mirror 802. The adjustable appendage is extensible to fit varying sizes of primary rearview mirrors 802 (not shown).

Although specific embodiments of the invention have been disclosed, it will be understood by those having skill in the art that changes can be made to this specific embodiment without departing from the spirit and scope of the invention. The scope of the invention is not to be restricted, therefore, to specific embodiments, and it is intended that the appended claims cover any and all such applications, modifications, and embodiments within the scope of the present invention.

What is claimed is:

1. An auxiliary rearview mirror assembly comprising:
   at least one non-incandescent light;
   a power source interface;
   a casing with a front side and a back side, the casing housing the non-incandescent light and the power source interface, wherein at least part of the non-incandescent light is exposed along one or more sides of the auxiliary rearview mirror so as to provide a path of illumination from the non-incandescent light outside the casing;
   an auxiliary rearview mirror mounted on the front side of the casing; and
   a primary rearview mirror mounting assembly integrated into the back side of the casing including:
      at least one fixed appendage;
      at least one adjustable appendage; and
      at least one bias element coupled to the adjustable appendage;
      wherein the fixed appendage opposes the adjustable appendage and the bias element applies a force on the adjustable appendage in a direction towards the fixed appendage so as to hold the casing onto a primary rearview mirror.

2. The auxiliary rearview mirror assembly according to claim 1, wherein at least one opening formed between the front and the back provides a path of illumination from the non-incandescent light mounted inside the casing.

3. The auxiliary rearview mirror assembly according to claim 1, wherein the non-incandescent light is at least one of the following:
   a black light;
   a neon light; and
   a flourescent light.

4. The auxiliary rearview mirror assembly according to claim 1, further comprising a switch operable to complete an electric circuit including the non-incandescent light and a power source adapter.

5. The auxiliary rearview mirror assembly according to claim 1, wherein the power source interface is electrically coupled to the power source adapter including a plug adapted to receive power from a vehicle auxiliary power receptacle.

6. The auxiliary rearview mirror assembly according to claim 1, wherein the power source interface is electrically coupled to at least one of the following power sources:
   a battery;
   a power supply; and
   a generator.

7. The auxiliary rearview mirror assembly according to claim 1, wherein the casing is manufactured from one or more of the following:
   plastic; and
   metal.

8. The auxiliary rearview mirror assembly according to claim 7, wherein the casing is formed with a color and/or formed to be translucent.

9. The auxiliary rearview mirror assembly according to claim 1, wherein the auxiliary rearview mirror is:
   flat;
   concave; and
   convex.

10. An auxiliary rearview mirror assembly comprising:
    at least one black light;
    a power source interface;
    a casing with a front side and a back side, the casing housing the black light and the power source interface, wherein at least part of the black light is exposed along one or more sides of the auxiliary rearview mirror so as to provide a path of illumination from the black light outside the casing;
    an auxiliary rearview mirror mounted on the front side of the casing; and
    a primary rearview mirror mounting assembly integrated into the back side of the casing including:
       at least one fixed appendage;
       at least one adjustable appendage; and
       at least one bias element coupled to the adjustable appendage;
       wherein the fixed appendage opposes the adjustable appendage and the bias element applies a force on the adjustable appendage in a direction towards the fixed appendage so as to hold the casing onto a primary rearview mirror.

11. The auxiliary rearview mirror assembly according to claim 10, wherein at least one opening formed between the front and the back provides a path of illumination from the black light mounted inside the casing.

12. The auxiliary rearview mirror assembly according to claim 10, wherein the power source interface is electrically coupled to a power source adapter including a plug adapted to receive power from a vehicle auxiliary power receptacle.

13. The auxiliary rearview mirror assembly according to claim 10, wherein the casing is manufactured from one or more of the following:
    plastic; and
    metal.

14. The auxiliary rearview mirror assembly according to claim 13, wherein the casing is formed with a color and/or formed to be translucent.

15. The auxiliary rearview mirror assembly according to claim 10, wherein the auxiliary rearview mirror is:
    flat;
    concave; and
    convex.

16. An auxiliary rearview mirror assembly comprising:
    at least one neon light;
    a power source interface;
    a casing with a front side and a back side, the casing housing the neon light and the power source interface, wherein at least part of the neon light is exposed along one or more sides of the auxiliary rearview mirror so as to provide a path of illumination from the neon light outside the casing;
    an auxiliary rearview mirror mounted on the front side of the casing; and a primary rearview mirror mounting assembly integrated into the back side of the casing including:
  at least one fixed appendage;
  at least one adjustable appendage; and
  at least one bias element coupled to the adjustable appendage;
  wherein the fixed appendage opposes the adjustable appendage and the bias element applies a force on the adjustable appendage in a direction towards the fixed appendage so as to hold the casing onto a primary rearview mirror.

17. The auxiliary rearview mirror assembly according to claim 16, wherein at least one opening formed between the front and the back provides a path of illumination from the neon light mounted inside the casing.

18. The auxiliary rearview mirror assembly according to claim 16, wherein the power source interface is electrically coupled to a power source adapter including a plug adapted to receive power from a vehicle auxiliary power receptacle.

19. The auxiliary rearview mirror assembly according to claim 16, wherein the casing is manufactured from one or more of the following:
  plastic; and
  metal.

20. The auxiliary rearview mirror assembly according to claim 19, wherein the casing is formed with a color and/or formed to be translucent.

21. The auxiliary rearview mirror assembly according to claim 16, wherein the auxiliary rearview mirror is:
  flat;
  concave; and
  convex.

* * * * *